(12) United States Patent
Tamura

(10) Patent No.: US 6,781,576 B2
(45) Date of Patent: Aug. 24, 2004

(54) WIRELESS INPUT APPARATUS AND METHOD USING A THREE-DIMENSIONAL POINTING DEVICE

(75) Inventor: Yasuhiro Tamura, Yashio (JP)

(73) Assignee: Sensation, Inc., Tokyo (JP)

( * ) Notice: Subject to any disclaimer, the term of this patent is extended or adjusted under 35 U.S.C. 154(b) by 67 days.

(21) Appl. No.: 09/809,550

(22) Filed: Mar. 14, 2001

(65) Prior Publication Data

US 2002/0133310 A1 Sep. 19, 2002

(51) Int. Cl.$^7$ ................................. G09G 5/00
(52) U.S. Cl. .................... 345/173; 345/156; 178/18.05; 178/18.1; 178/19.01
(58) Field of Search ................................. 345/156–158, 345/161, 163, 168, 169, 173, 174, 901, 905, 902, 716, 740, 764, 773, 778, 831, 856; 178/18.01, 18.03, 18.05, 18.1, 19.01, 19.04, 20.01, 20.04; 341/22, 23, 34, 176; 348/736; 273/148 B; 463/37–39

(56) References Cited

U.S. PATENT DOCUMENTS

| | | | | |
|---|---|---|---|---|
| 4,687,885 A | * | 8/1987 | Talmage et al. ......... 178/18.05 |
| 4,736,191 A | * | 4/1988 | Matzke et al. ................ 341/20 |
| 5,852,260 A | * | 12/1998 | Yoshikawa ............... 178/18.01 |
| 5,943,044 A | * | 8/1999 | Martinelli et al. .......... 345/174 |
| 5,956,025 A | * | 9/1999 | Goulden et al. ............ 345/716 |
| 6,326,948 B1 | * | 12/2001 | Kobachi et al. ............ 345/157 |
| 6,396,523 B1 | * | 5/2002 | Segal et al. ................. 345/863 |
| 6,437,836 B1 | * | 8/2002 | Huang et al. ............... 348/734 |
| 6,522,320 B1 | * | 2/2003 | Chou .......................... 345/157 |

* cited by examiner

*Primary Examiner*—Henry N. Tran
(74) *Attorney, Agent, or Firm*—Gray Cary Ware & Freidenrich LLP

(57) ABSTRACT

A wireless input apparatus by which a user can input various types of information is provided. A conventional remote control of electronic equipment has many buttons or switches to perform various kinds of functions. Therefore, its operability is likely to be lost because of the complexity and the bulkiness of the remote control. The wireless input apparatus has a LCD to display a screen for operation and a 3-D mouse for a user to operate. The user can input various types of operations on the screen and remotely control the equipment. Moreover, a pressure-sensitive resistance film is applied to the 3-D mouse for sensing pressure applied by the user. Even if a very slight amount of pressure is applied to the mouse, the pressure can be effectively detected.

6 Claims, 9 Drawing Sheets

WIRELESS INPUT APPARATUS AND METHOD USING A THREE-DIMENSIONAL POINTING DEVICE

BACKGROUND OF THE INVENTION

1. Field of the Invention

The present invention relates to a wireless input apparatus and method, and it particularly relates to a wireless input apparatus that is provided as an attachment with electronic equipment and remotely controls the electronic equipment using a wireless communication means.

2. Description of the Related Art

Electric home appliances such as a TV set, a video, and an air conditioner are controlled remotely. For instance, a remote control for a TV set has a power button, channel buttons to change channels, and volume control buttons to turn up or down the volume level. These buttons are arranged on the body of the remote control. In front of the body, an infrared transmitting unit is provided in order to send a signal to the TV set. When a user presses down any button, predefined command data corresponding to the pressed button are generated by a CPU inside the body, and the data are transmitted to the TV set via the infrared transmitting unit. Thus, the user can remotely perform various types of controls such as power on/off, channel switching, volume adjustment and the like, by operating the various kinds of buttons on the remote control.

A remote control of a video tape recorder has other types of buttons arranged such as play, record, stop, rewind, forward and the like. A remote control of an air conditioner has types of buttons arranged such as for switching between heating/cooling or adjusting temperature. Thus, the buttons arranged on the remote control differ very much in their arrangement, types, and number, depending on the equipment under control.

In addition, recent electric home appliances become intelligent with a built-in microprocessor, and a stage is coming to investigate an in-home network to interconnect electric home appliances as well as personal computers.

Under these situations, the number of the electric appliances that the user operates increases and the user operation is becoming complicated. Different remote controls are attached with the electric appliances and each of the remote controls has different types of buttons in a different arrangement. Therefore, it is very annoying for the user to remember its operation. Moreover, as the buttons increase in type and number, the size of the remote control becomes large. For instance, in order a letter to be input to the equipment using the remote control, the remote control must have 26 buttons for alphabets arranged on the body and its operability will be very worse. For this reason, a method is taken to decrease the number of the buttons, for instance a way of realizing different operations by a simultaneous operation of multiple buttons or a combination of specific buttons. However in this case the user must remember the combination of the specific buttons and the user operation becomes complicated.

Since generally one button on a remote control corresponds to one command data, many buttons or switches are necessary to accommodate various kinds of functions for controlling the equipment. Therefore, its operability is likely to be lost because of the complexity and the bulkiness of the remote control.

SUMMARY OF THE INVENTION

The present invention has been made in view of the above-mentioned problems, and an object thereof is to provide a wireless input apparatus and method by which a user can input various types of information without many buttons or switched arranged on the apparatus.

According to one aspect of the present invention, a wireless input apparatus is provided. The apparatus includes a pointing device, a signal process unit, a pointer control unit, a process execution unit, and a wireless communication. The pointing device detects three-dimensional components of an externally applied pressure. The signal process unit defines a moving direction of a pointer based on an x-axis component and a y-axis component of the pressure, and detects whether the pointer is pressed or not based on a z-axis component of the pressure. The pointer control unit moves a position of the pointer based on the defined moving direction. The process execution unit generates a predefined command data when the pointer is pressed. The wireless communication unit transmits the command data to an external device using a wireless communication means.

The wireless communication unit may transmit the command data to the external device if said command data are data to be sent to the external. The signal process unit may judges that a pointer is pressed if the z-axis component of the pressure exceeds a predefined threshold. The signal process unit may detect the amount of the z-axis component of the pressure and judge the amount at multiple levels, and the process executing unit may generate different command data, depending on the level of the amount of the pressure.

The pointing device may include an operational part to which a three-dimensional external pressure is applied, and a sheet-like pressure-sensitive resistance member which detects the three-dimensional applied pressure.

The sheet-like pressure-sensitive resistance member may have a mesh pattern of electrodes on its surface that detect the three-dimensional components of the pressure. The sheet-like pressure-sensitive resistance member may have a mesh pattern of a plurality of electrodes on its surface each of which detects any one of the x-axis, the y-axis, and the z-axis components, and the signal process unit may convert analog signals obtained from the electrodes in the mesh regions to digital signals in a time divisional manner.

The signal process unit may perform timing control to form an output path for each of the electrodes of a signal from an i-th row of the electrode, and further perform timing control to select a j-th column of the electrode and to obtain an output value of the signal from the electrode in the (i,j) mesh region, and thereby detect a two-dimensional distribution of the output signals from the mesh pattern of the electrodes.

The sheet-like pressure-sensitive resistance member may have a mesh pattern of a plurality of electrodes on its surface each of which detects either the x-axis or the y-axis component, and each of the mesh has an electrode to detect the z-axis component of the pressure.

The sheet-like pressure-sensitive resistance member may have a fan-shaped pattern of electrodes on its surface that detect the three-dimensional components of the pressure. The sheet-like pressure-sensitive resistance member may have an electrode to detect the z-axis component of the pressure is arranged at a central part of its surface, and a fan-shaped pattern of a plurality of electrodes each of which detects either the x-axis or the y-axis component of the pressure surrounding the central part. A plurality of electrodes to detect the z-axis component of the pressure may be distributed in the regions of the x-axis and the y-axis electrodes arranged in the fan shape.

The apparatus may further include a display unit that displays an operation button to direct a command, and the display unit may display the pressed-down operation button when it is detected that the pointer is pressed down at the operation button, and the process execution unit may generate a predefined command data corresponding to the operation button.

According to another aspect of the present invention, a wireless input apparatus is also provided. The apparatus includes a pointing device which detects three-dimensional components of an externally applied pressure, a pointer control unit which controls a pointer based on the detected three-dimensional components of the pressure, a display unit which displays the pointer on a operational screen for a user, and a wireless communication unit which transmits a command specified by the pointer to an external device using a wireless communication means. As this pointing device, any of the pointing devices having the above-mentioned configurations may be used.

According to still another aspect of the present invention, a wireless input method is provided. The method includes displaying a screen to prompt a user to operate, detecting three-dimensional components of an external pressure applied to a pointing device, defining a moving direction of a pointer based on an x-axis component and a y-axis component of the pressure and moving the pointer on the screen, detecting whether a pointer is pressed down or not based on the z-axis component of the pressure and generates a predefined command data when the pointer is pressed down, and transmitting the command data to an external device using a wireless communication means.

Moreover, any arbitrary combination of the above-mentioned structural components in the present invention is still effective as an embodiment when applied as a method, a sensor, and a system and so forth.

Moreover, this summary of the invention does not necessarily describe all necessarily features so that the invention may also be sub-combination of these described features.

DETAILED DESCRIPTION OF THE INVENTION

The invention will now be described on the basis of the preferred embodiments, which do not intend to limit the scope of the present invention, but exemplify the invention. All of the features and the combinations thereof described in the embodiment are not necessarily essential to the invention.

Figure 1:
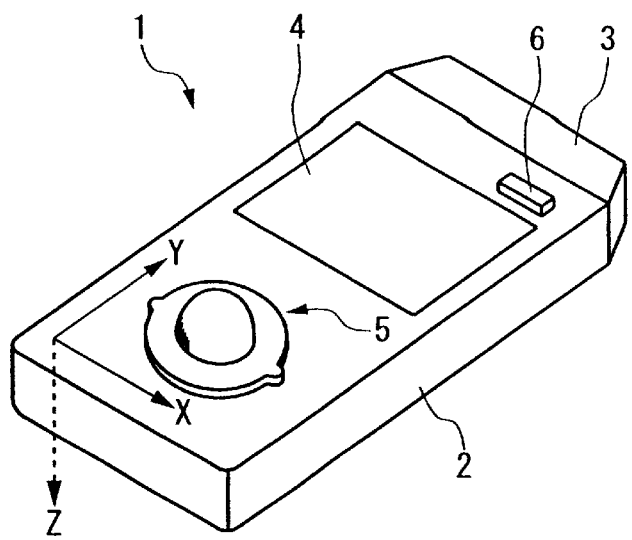
FIG. 1 illustrates an appearance of a remote control as a wireless input apparatus according to one embodiment of the present invention.

FIG. 1 illustrates an appearance of a remote control as a wireless input apparatus according to an embodiment of the present invention. A remote control 1 shown in the figure has a body 2 and an infrared transmitting unit 3. A liquid crystal display or LCD 4, a three-dimensional mouse 5 and a power switch 6 are arranged on the top of the body 2. When the power switch 6 is pressed down, a screen to prompt a user to operate is displayed on the LCD 4. The user can remotely operate electronic equipment such as a TV set or a VTR. As such remote operations, the user can input information to the equipment, change channels, play videotape or record on videotape.

The 3-D mouse 5 detects pressure applied by the user operation and obtains three-dimensional components of the pressure, namely, an x-axis component and a y-axis component corresponding to the direction of operating the 3-D mouse 5, and a z-axis component corresponding to the direction of pressing the 3-D mouse 5. The 3-D mouse 5 detects the three-dimensional components of the pressure as electric signals through a change in resistance value of a sensor unit by the pressure, as described later.

The obtained three-dimensional components of the pressure are provided to a CPU inside the body 2, which will be described later in detail. The CPU executes such a process of moving the pointer of the 3-D mouse 5 or performing a operation indicated by the pointer. The CPU also generates prescribed command data and transmits the data via the infrared transmitting unit 3 if the operation command should be sent to the equipment under control. The command data are received by the equipment under control and thereby the equipment is controlled remotely. The infrared transmitting unit 3 may receive a response signal such as a notification of receiving the command data and data indicating an updated status after the operation. In addition, the CPU may have the information received from the equipment under control displayed on the LCD 4.

Figure 2A:
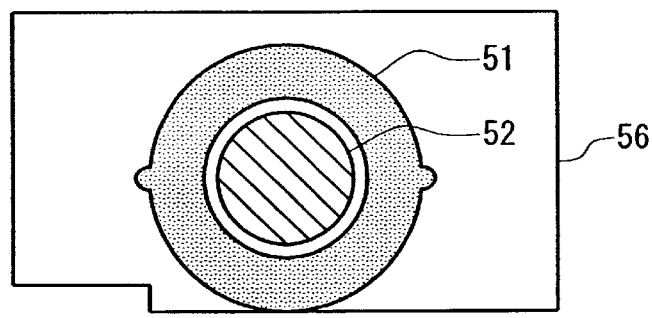
FIGS. 2A and 2B are respectively a top view and a side view of a 3-D mouse.
Figure 2B:
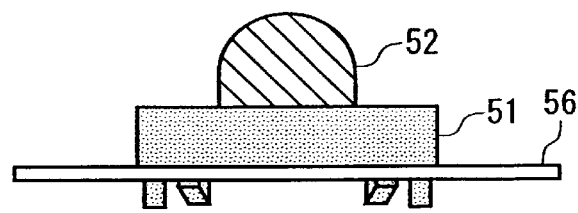

FIGS. 2A and 2B are respectively a top view and a side view of the 3-D mouse 5. The 3-D mouse 5 is so configured that a key top 52 and a case 51 are arranged on a sensor substrate 56. The sensor substrate 56 is implemented inside the body 2 and electric signals of the detected pressure are transmitted to the CPU in the body 2.

Figure 3:
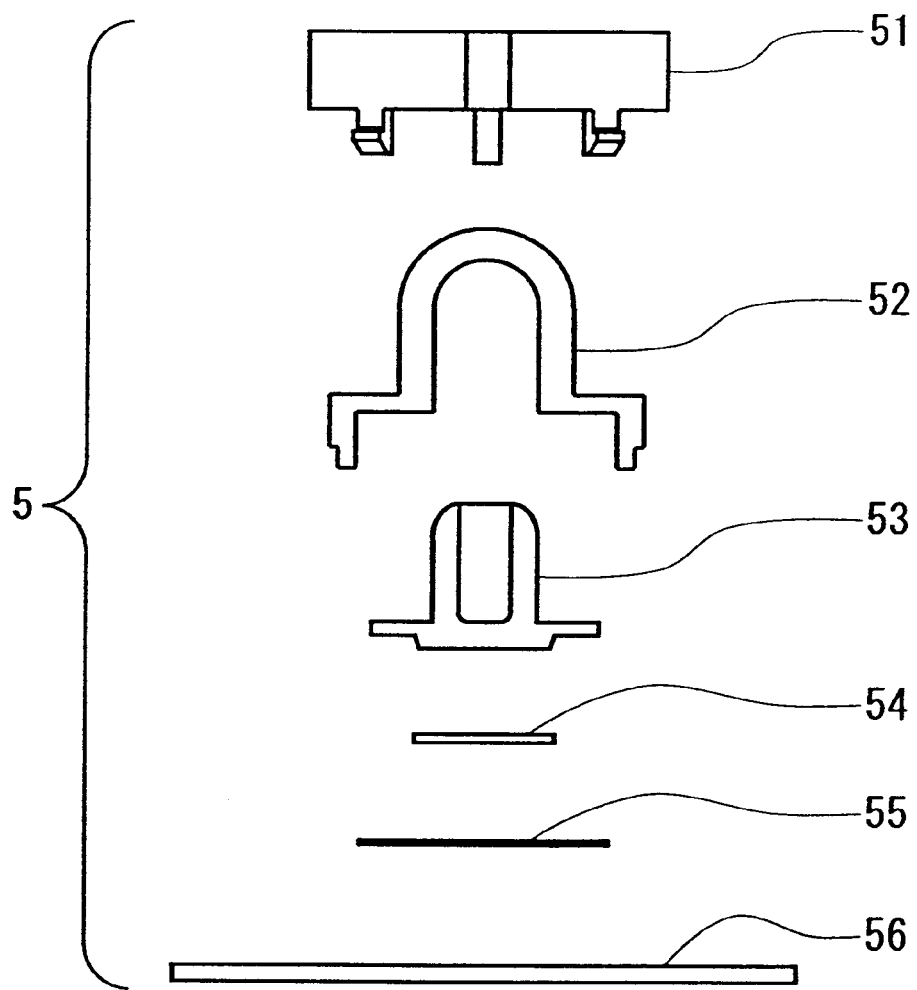
FIG. 3 shows an internal structure of the 3-D mouse of FIGS. 2A and 2B.

FIG. 3 shows an internal structure of the 3-D mouse 5. The 3-D mouse 5 has the case 51, the key top 52, a pressure transferring part 53, a rubber sheet 54, a sensor sheet 55, and the sensor substrate 56. When a user operates the key top 52, the pressure is applied to the pressure transferring part 53. The pressure added to the sensor sheet 55 from the bottom of the pressure transferring part 53 through the rubber sheet 54 distributes differently depending on the direction and the amount of the applied pressure. The sensor sheet 55 detects the distribution of the pressure and transmits the pressure information as electric signals to the sensor substrate 56 via signal output leads attached to the sensor sheet 55. The sensor substrate 56 has a built-in IC chip to execute a predefined signal processing for the pressure information obtained from the sensor sheet 55.

Figure 4:
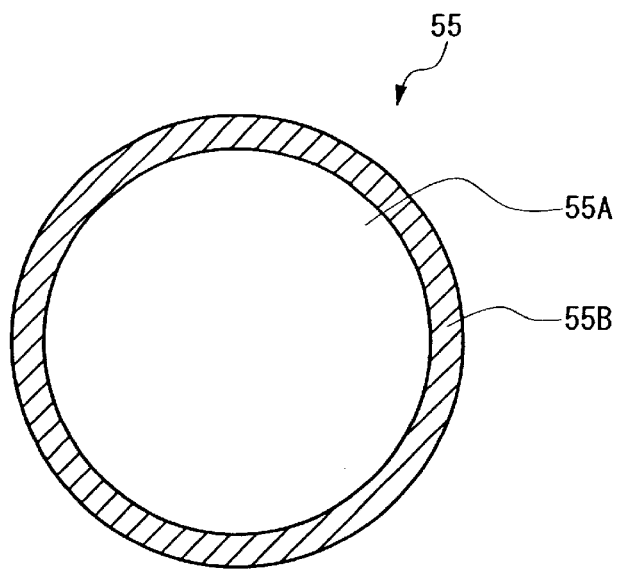
FIG. 4 is a backside of the sensor sheet of FIG. 3.

FIG. 4 shows a backside of the sensor sheet 55. An outer circumference 55B of the sensor sheet 55 has a double-sided adhesive tape attached, and adheres to the sensor substrate 56. As described later, the sensor sheet 55 has signal output leads that are not shown in this figure, and the output leads are connected to the electrodes of the sensor substrate 56 so that the electric signals detected by the sensor sheet 55 can be provided to the sensor substrate 56.

Figure 5:
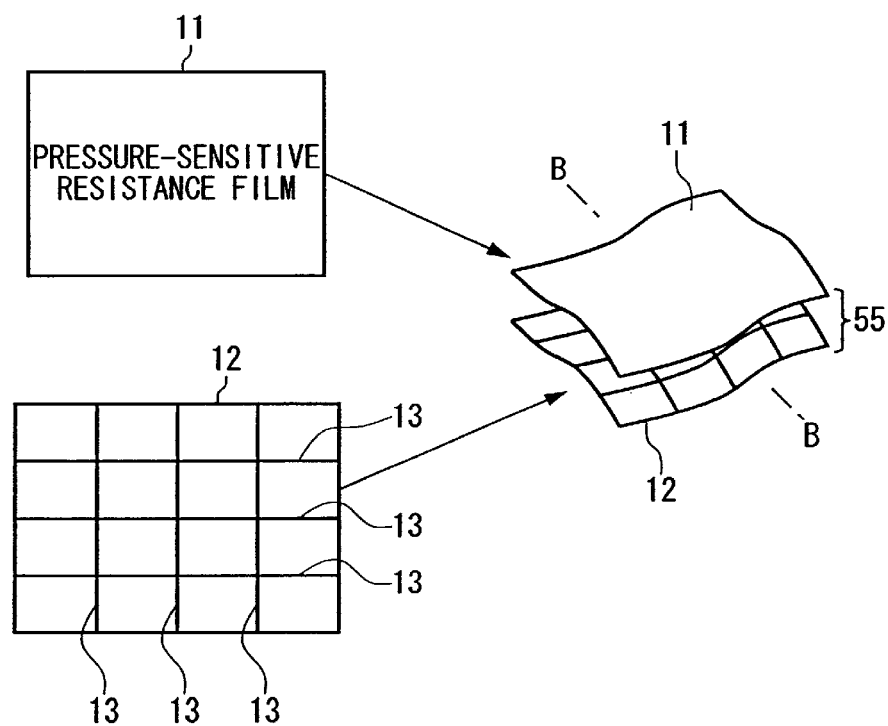
FIG. 5 is a schematic view showing the structure of the sensor sheet of FIG. 3.

As the sensor sheet 55, it is preferable to use a sheet like pressure-sensitive resistance member that the inventor of the present invention propose in U.S. Pat. No. 5,997,996. FIG. 5 is a schematic view showing the structure of the sensor sheet 55 In the following, for a convenience of the explanation, the sensor sheet 55 is shown in a rectangular shape. However, when it is implemented into the 3-D mouse 5, the sensor sheet 55 is cut off into a circular shape. In another case, a mesh pattern of electrodes, which will be described later, may be formed in curves as it fits to a sensor sheet 55 in a circular shape. In FIG. 5, the sensor sheet 55 has a pressure-sensitive resistance film 11 and an electrode film 12. In a manufacturing process, the pressure-sensitive resistance film 11 and the electrode film 12 are bonded together using an adhesive or the like to form an electrode-provided pressure-sensitive resistance film. In this figure, reference numeral 13 denotes an electrode.

Figure 6:
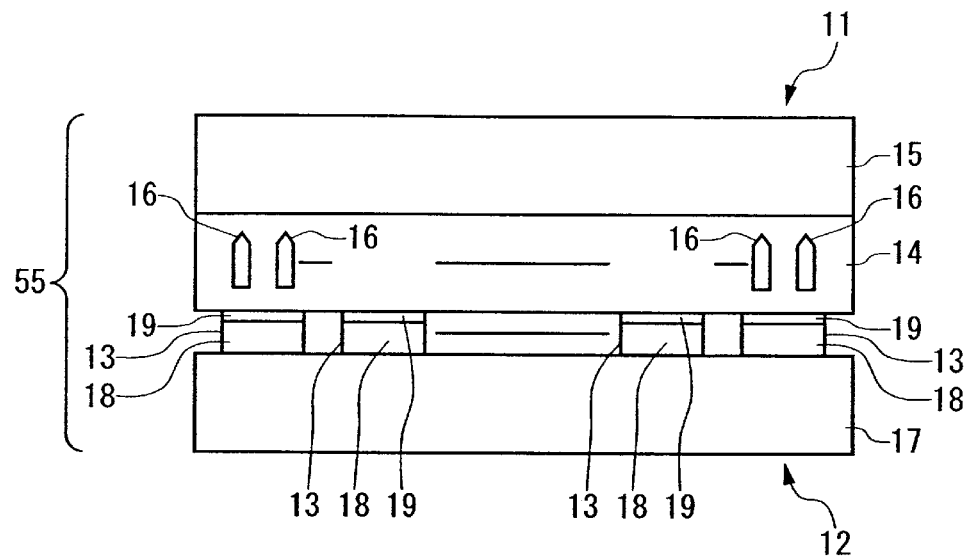
FIG. 6 is a cross-sectional view taken along the line B—B of FIG. 5.

FIG. 6 is a cross-sectional view taken along the line B—B of FIG. 5. As schematically shown in FIG. 6, the pressure-sensitive film 11 includes a conductive film 14 and a protective film 15. The upper surface of the conductive film 14 is joined with the protective film 15, and the lower surface thereof is joined with the electrode film 12. Thus, the above-mentioned electrode-provided pressure-sensitive resistance film is produced.

The conductive film 14, as shown in FIG. 6, contains conductive particles 16 arranged such that the conducting direction of the conductive particles intersects the film surface. Specifically, the conductive particles 16 made of carbon, metal, or the like are mixed with a resin material, such as acrylic resin, silicone resin or polycarbonate (PBT). Then, the mixture is molded into a sheet while a tensile force is applied to the sheet in the widthwise direction thereof so as to orient the conductive particles 16 such that the conducting direction of the conductive particles perpendicularly intersects the surface of the molded sheet.

With the conductive particles 16 thus arranged, the conductive film 14 can very efficiently transfer increases or decreases in external pressure to the electrode film 12. Consequently, the sensitivity in detecting an increase/decrease of the pressure or load applied to the 3-D mouse 5 is greatly increased. In addition, since the loaded position on the 3-D mouse 5 is accurately transferred to a corresponding position on the electrode film 12, the detection accuracy for the loaded position is also greatly increased.

The protective film 15 protects the conductive film 14 and is formed for this purpose using a protective member, such as polyester film or polyvinyl chloride film. The protective film 15 and the above-mentioned upper surface of the conductive film 14 are subjected to heat treatment in order that they are integrally joined together to form the pressure-sensitive resistance film 11. The thus formed pressure-sensitive resistance film 11 has increased durability while maintaining an appropriate degree of flexibility.

The electrode film 12 is manufactured using an etchable sheet-like substrate 17 that is made of epoxy or polyimide, for example, and is coated with a copper foil. The copper foil of the substrate 17 is etched so as to form electrodes 13 arranged in a mesh-like pattern in FIG. 5. More particularly, to form the electrodes 13, a silver-base member 19 formed from molten silver alloy, e.g., silver oxide having a silver content of about 90% is applied onto an electrode pattern of copper foil 18 by a suitable printing process, such as silkscreen, as shown in FIG. 6. The electrode pattern of copper foil 18 and the silver-base member 19 applied thereto are then heat-treated at about 270 degrees Celsius for about 20 seconds.

By virtue of the processes described above, the hardness of the surface of silver-base member 19 is increased, thereby improving the durability of the electrodes 13 themselves. Soldering operations, for example, to connect leads to the electrodes 13 for taking out information about the change in resistance value also become easier. These signal output leads are provided to obtain the above-mentioned x-axis, y-axis, and z-axis components of the pressure and denoted by reference numerals 13X, 13Y, and 13Z in FIG. 7.

Figure 7:
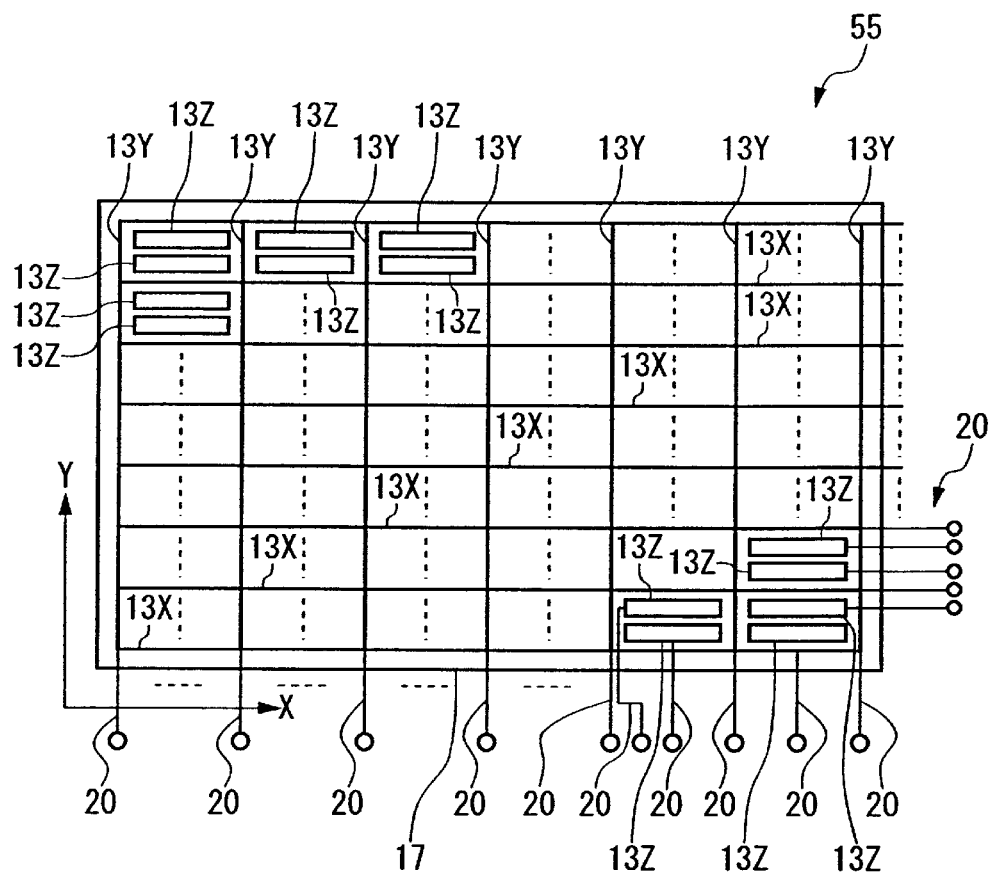
FIG. 7 is a schematic view of the electrode film of FIG. 6.

FIG. 7 is a schematic view of the electrode film 12. As shown in FIG. 7, the electrode film 12 of the embodiment has a plurality of x-axis electrodes 13X, a plurality of y-axis electrodes 13Y that intersect orthogonally to the x-axis electrodes 13X, and a plurality of z-axis electrodes 13Z each of which is arranged within a rectangular area surrounded by each x-axis electrode 13X and each y-axis electrode 13Y.

These x-axis electrodes 13X, y-axis electrodes 13Y, and z-axis electrodes 13Z are insulated from each other and the detected signal output leads 20 are attached to each of these electrodes 13X, 13Y and 13Z by soldering or the like in order to connect the CPU. Note that some of the output leads 20 are omitted in the figure.

In the embodiment, since the conductive film 14 in which conductive particles are arranged such that the conducting direction intersects the film surface is applied to the 3-D mouse 5, even if a very slight amount of pressure is applied, the remote control 1 can effectively transfer the pressure to the x-axis and y-axis electrodes for detecting its direction and to the z-axis electrode for detecting its amount. Therefore the detection sensitivity of the 3-D mouse is greatly increased, and thereby the detection accuracy of the three-dimensional components of the pressure is greatly increased.

Although it is not necessary to pluralize the electrodes 13X, 13Y and 13Z as described above, the above-mentioned configuration of this embodiment increases the detection resolution in the x-axis, y-axis and z-axis directions and thereby signals for inputting three-dimensional information can be very accurately detected.

Figure 8:
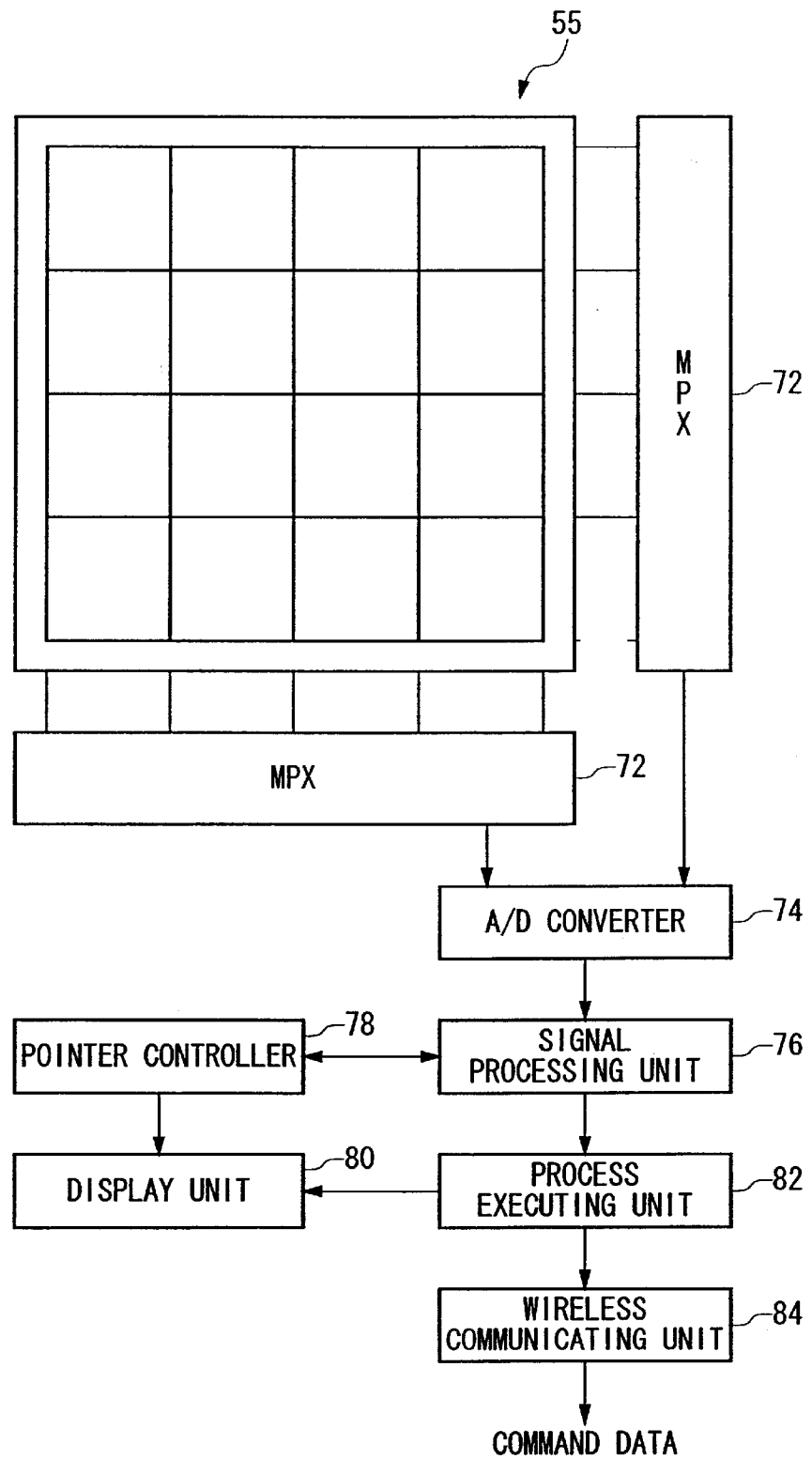
FIG. 8 is a functional block diagram of a CPU in the body of the remote control of FIG. 1.

FIG. 8 is a functional block diagram of the CPU in the body 2 of the remote control 1. The obtained signals from the signal output leads of the sensor sheet 55 are divided in terms of time at a multiplexer 72 and converted to digital signals at an A/D converter 74 and then processed at a signal processing unit 76. The multiplexer 72, the A/D converter 74, and the signal processing unit 76 are implemented as ICs in the sensor substrate 56 of the 3-D mouse 5. The signals processed by the signal processing unit 76 are given to a pointer controller 78 and a process executing unit 82, and for instance the movement of the pointer is controlled and the process based on the operation is executed. In this process, if there is any command or inputted information to be transmitted to the equipment under control, predefined command data are generated at the process executing unit 82, and the command data are transmitted via a wireless communication unit 84. A display unit 80 displays a operation screen as well as the position of the pointer, and updates the screen according to the operation indicated by the pointer.

The pointer controller 78 and the process executing unit 82 are implemented as program modules executed by the CPU in the body 2 of the remote control 1. The wireless communication unit 84 is a function block implemented in the infrared transmitting unit 3. The display unit 80 is implemented as a driver program to drive the LCD 4. As a matter of course, the processes executed at the CPU may be executed at an IC implemented in the sensor substrate 56. On the contrary, some of the processes executed at the ICs implemented in the sensor substrate 56 may be executed at the CPU in the body 2 of the remote control 1. Thus any configuration can be made in distributing the processes between the ICs of the sensor substrate 56 and the CPU of the remote control 1, depending on the implementation. In addition, instead of the infrared communication, any other wireless communication means may be used for the communication with the equipment under control.

Each of multiplexers 72 is provided respectively corresponding to the x-axis electrodes 13X, the y-axis electrodes 13Y and the z-axis electrodes 13Z, although a multiplexer corresponding to the z-axis electrodes 13Z is not shown in the figure. The resistance defined between any one of x-axis electrodes 13X, y-axis electrodes 13Y, and z-axis electrodes 13Z, and the conductive film 11 is multiplexed into analog data by each multiplexer 72. The A/D converter 74 converts the analog resistance data from each multiplexer 72 to, for instance, 256 bits of digital data.

The signal processing unit 76 analyzes a change in the resistance value of each electrode 13X, 13Y and 13Z by processing the resistance information given by the A/D converter 74, and detects the direction of the pressure applied to the 3-D mouse 5, that is, the x-axis and y-axis components, and the increase and decrease of the pressure, that is, the z-axis component. According to the detected result, the pointer displayed on the LCD 4 is moved, or a button on the screen is clicked and a predefined remote operation is performed. The signal processing unit 76 can obtain the output signal of the pressure detected at each mesh of the sensor sheet 55 in a time divisional manner, by controlling the multiplexers 72 with control signals.

Figure 9:
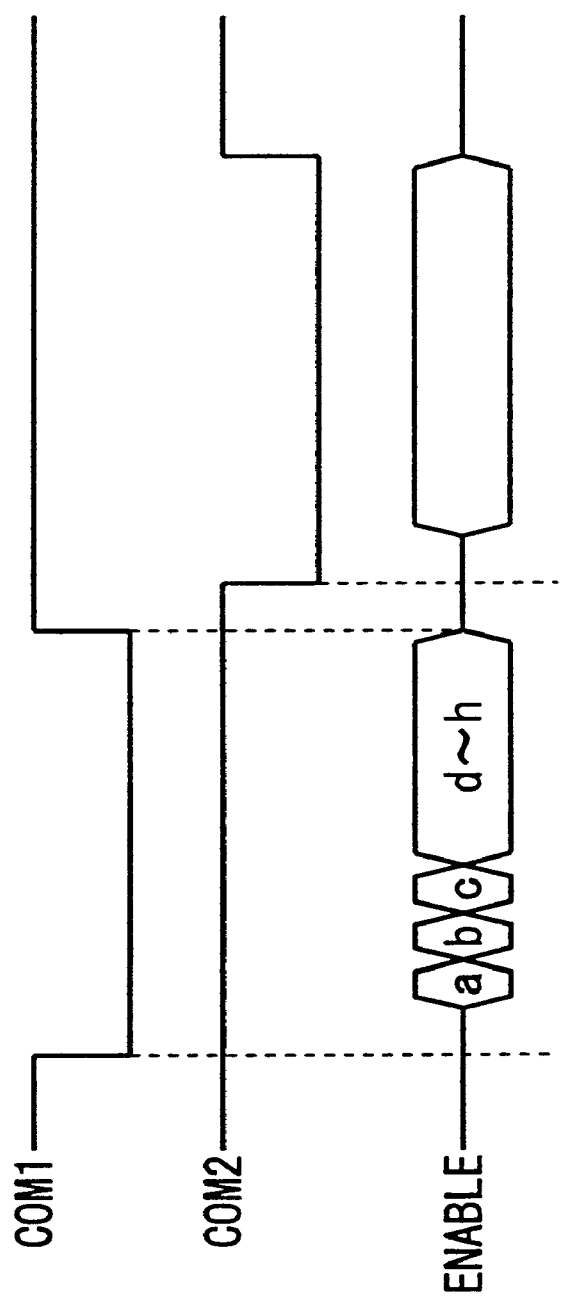
FIGS. 9A, 9B and 9C explain a signal process to obtain an output signal from each mesh of the sensor sheet of FIG. 7 in a time divisional manner.

FIGS. 9A, 9B and 9C explain the signal process to obtain the output signal from each mesh of the sensor sheet 55 in a time divisional manner. The case of mesh in 8-row by 8-column is explained. Control signals COM1 to COM8 are sequentially given for each of the 8 rows, and the signal output path of each row of the electrodes is sequentially activated. For instance, while the first row of the output path is activated, 8 channels a to h corresponding to the 8 columns are sequentially activated with an enable signal, and thereby the output values from the meshes in 1st row by 1st column to 1st row by 8th column are read in order. Thus the output values of the x-axis electrode and the y-axis electrode crossing at each mesh, and the output value of the z-axis electrode at each mesh are read sequentially in a time divisional manner. The signal processing unit 76 detects the direction of the pressure applied to the 3-D mouse 5 and the amount of the pressure from the two-dimensional distribution of the output values obtained from the x-axis, y-axis, and z-axis electrodes.

Figure 10:
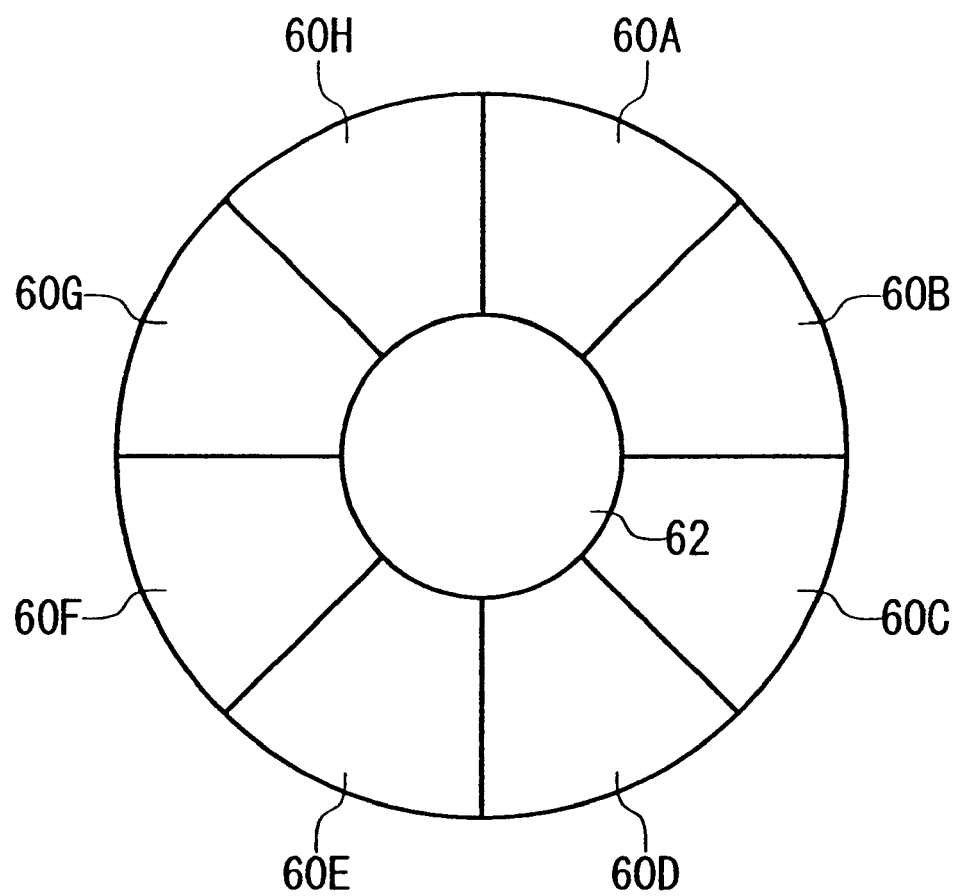
FIG. 10 shows another configuration of the sensor sheet of FIG. 3.

FIG. 10 shows another configuration of the sensor sheet 55. In this configuration, instead of a mesh of electrodes stated above, the z-axis electrode is arranged in a central part 62 and the x-axis electrodes and the y-axis electrodes are arranged in an alternation around the z-axis electrode. The figure shows such a configuration. The surrounding parts 60A to 60H are the electrode regions divided into eight equal parts, and the x-axis and the y-axis electrodes are alternately arranged. When the pressure is applied to the 3-D mouse 5, the direction of the pressure can be detected by the distribution of the output values from the surrounding parts 60A to 60H, and when the 3-D mouse 5 is pressed down, the amount of the pressure can be detected by the output value from the central part 62.

Figure 11:
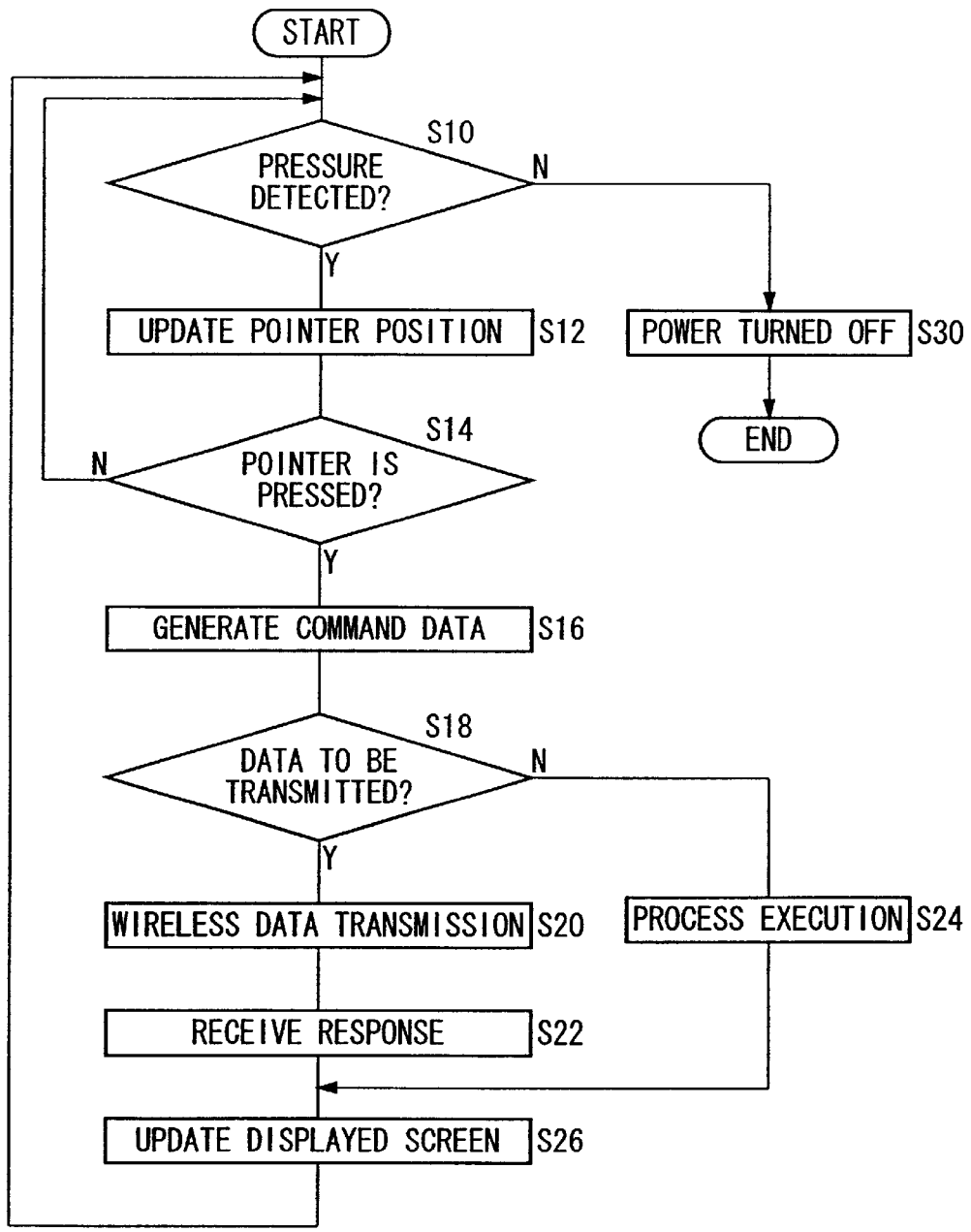
FIG. 11 shows a flow chart showing a procedure by a remote control according to one embodiment of the present invention.

FIG. 11 shows a flow chart showing a procedure by a remote control 1 having the above-mentioned configuration. A user operates the 3-D mouse 5 and the pressure applied to the 3-D mouse 5 is detected (S10). When the signal processing unit 76 detects the three-dimensional components of the pressure (Y of S10), the pointer controller 78 determines the moving direction and amount of the pointer displayed at the LCD 4 based on the x-axis component and the y-axis component of the pressure, and changes the position of the pointer (S12). For instance, either the x-axis or the y-axis component is not zero, the pointer continues to move. The moving speed of the pointer may change depending on the volume of the x-axis and the y-axis components.

Next, the signal processing unit 76 examines whether the value of the z-axis component exceeds a predefined threshold (S14), and if it exceeds (Y of S14), the signal processing unit 76 judges that the pointer was pressed down, and the process executing unit 82 generates command data based on the content displayed at the position of the pointer (S16). For instance, if an operation button is located at the pointer position, it is recognized that the operation button was clicked, and then operation command data are generated.

The process executing unit 82 judges whether the command data are data to be transmitted to the equipment under control (S18), and if it is (Y of S18), the wireless communication unit 84 sends the command data using a wireless communication means, for instance infrared communication (S20). The wireless communication unit 84 receives a response from the equipment under control (S22), and the display unit 80 updates the screen if necessary (S26). For instance, the display unit 80 displays the response result if necessary or updates status information displayed. At the step S18, if the command data is not data to be transmitted (N of S18), the process executing unit 82 executes a prescribed process within the remote control 1 (S24). For instance, an internal parameter or status is updated and then a new screen is displayed for the user to enter another command.

Figure 12:
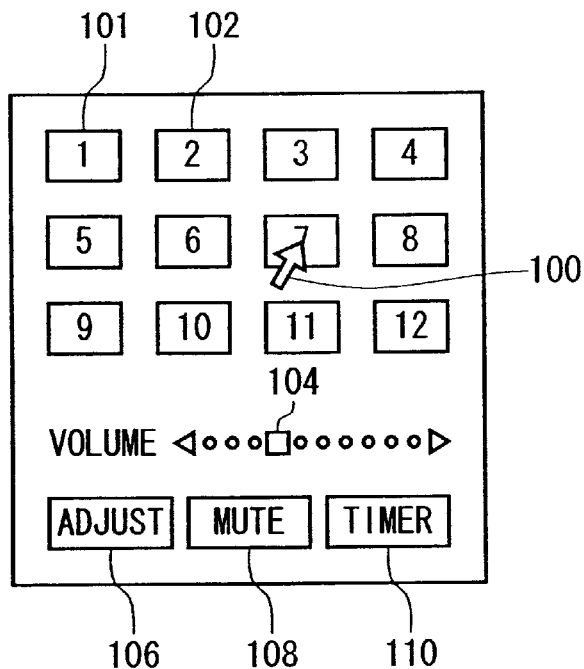
FIG. 12 illustrates a screen displayed on the remote control of FIG. 1.
Figure 13:
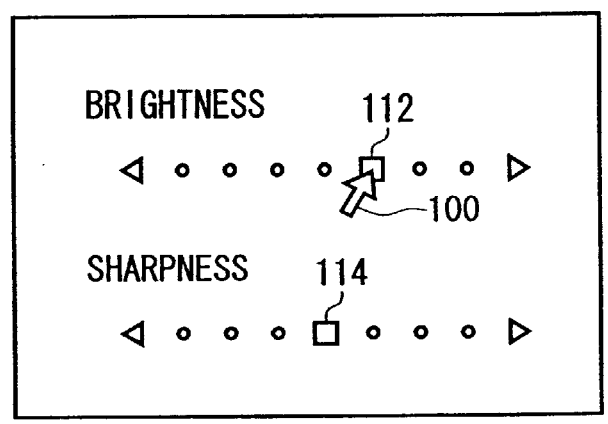
FIG. 13 illustrates a screen displayed on the remote control of FIG. 1.

An example is explained. As shown in FIG. 12, the screen of the remote control 1 displays TV channels 101, 102, a volume control 104, an adjustment button 106, a mute button 108, and a timer button 110. For instance, the user moves the pointer 100 on the screen by using the 3-D mouse 5 and selects one of channels by pressing the 3-D mouse 5. Then, a command data to change to the selected channel is generated and transmitted to the TV set. If the user clicks the adjustment button 106, the process executing unit 82 directs the display unit 80 to display a screen for adjustment. The display unit 80 then displays an operation screen for adjusting brightness and sharpness as shown in FIG. 13 and prompts the user to perform further operations by using adjustment control 112 and 114.

Referring to FIG. 11 again, if the signal processing unit 76 judges that the pointer was not pressed down (N of S14), the procedure goes back to the step S10 and then waits until any pressure is detected. A time-out is set at the step S10, and if no pressure is detected during a predefined time (N of S10), the power is automatically turned off (S30), and the procedure ends.

At the step S14, if the z-axis component of the detected pressure continues to exceed the threshold and the x-axis and/or the y-axis components are detected at the same time, it may be recognized that the user intends to move the pointer while pressing, and a process for moving the pointer as it remains pressed may be executed. For instance, the user can move the pointer to the volume control 104 and press the 3-D mouse 5, and then adjust the volume by moving the volume control 104 to the right or left side while the control 104 remains selected.

The three-dimensional components of the detected pressure has somewhat disperses because the change in the resistance value of the sensor sheet 5 is not always proportional to the pressure applied. For this reason, the signal processing unit 76 may correct the detected value.

As described above, the wireless input apparatus of the embodiment can display an operation screen on the display and receive operations from the user via the 3-D pointer without operation buttons provided on its body. The user can input various types of operations on the screen and remotely control the equipment. Therefore, the apparatus can be widely applied for general uses and the ease of the operation is highly increased. In addition, the size of the apparatus can be minimized and thereby production cost can be reduced.

Moreover, since the sheet-like pressure-sensitive resistance member in which conductive particles are arranged such that the conducting direction intersects the sheet surface is applied to the sensor unit of the 3-D mouse 5, even if a very slight amount of pressure is applied to the mouse 5, the three-dimensional components of the pressure can be effectively detected. Therefore the performance of the input apparatus is highly enhanced.

Although the present invention has been described by way of exemplary embodiments, it should be understood that those skilled in the art might make many changes and substitutions without departing from the spirit and the scope of the present invention that is defined by the appended claims. Such alteration is now stated.

In the above explanation, the moving direction of the pointer is determined by the x-axis and y-axis components of the applied pressure, and the amount of the pressure applied to the pointer is detected by the z-axis components of the pressure. However, if the LCD displays a virtual space stretching in three-dimensions, the direction of moving the pointer may be defined in three dimensions by the three-dimensional components of the pressure and the amount of moving the pointer may be defined by the amount of the detected pressure.

What is claimed is:

1. A wireless input apparatus comprising:
   a pointing device which detects three-dimensional components of an externally applied pressure;
   a signal process unit which defines a moving direction of a pointer based on an x-axis component and a y-axis component of the pressure, and defects whether the pointing device is pressed or not based on a z-axis component of the pressure;
   a pointer control unit which moves a position of the pointer based on the defined moving direction;
   a process execution unit which generates a predefined command data when the pointing device is pressed; and
   a wireless communication unit which transmits the command data to an external device using a wireless communication means;
   wherein said pointing device includes:
      an operational part to which a three-dimensional external pressure is applied; and
      a sheet-like pressure-sensitive resistance member which detects the three-dimensional applied pressure, wherein said sheet-like pressure-sensitive resistance member has a mesh pattern of a plurality of electrodes on its surface each of which detects any one of the x-axis, the y-axis, and the z-axis components, and said signal process unit converts analog signals obtained from the electrodes in the mesh regions to digital signals in a time divisional manner;
   wherein said signal process unit performs timing control to form an output path for each of the electrodes of a signal from an i-th row of the electrode, and further performs timing control to select a j-th column of the electrode and to obtain an output value of the signal from the electrode in the (i,j) mesh region, and thereby detects a two-dimensional distribution of the output signals from the mesh pattern of the electrodes.

2. A wireless input apparatus comprising:
   a pointing device which detects three-dimensional components of an externally applied pressure;
   a signal process unit which defines a moving direction of a pointer based on an x-axis component and a y-axis component of the pressure, and detects whether the pointing device is pressed or not based on a z-axis component of the pressure;
   a pointer control unit which moves a position of the pointer based on the defined moving direction;
   a process execution unit which generates a predefined command data when the pointing device is pressed; and
   a wireless communication unit which transmits the command data to an external device using a wireless communication means;
   wherein said pointing device includes:
      an operational part to which a three-dimensional external pressure is applied; and
      a sheet-like pressure-sensitive resistance member which detects the three-dimensional applied pressure, wherein said sheet-like pressure-sensitive resistance member has a mesh pattern of a plurality of electrodes on its surface each of which detects either the x-axis or the y-axis component, and each of the mesh has an electrode to detect the z-axis component of the pressure;
   wherein said signal process unit performs timing control to form an output path for each of the electrodes of a signal obtained from an i-th row of the electrode, and further performs timing control to select a j-th column of the electrode and to obtain output values of the signals from the x-axis, the y-axis, and the z-axis electrodes corresponding to the (i,j) mesh, and thereby detects a two-dimensional distribution of the output signal from the mesh pattern of the electrodes.

3. A wireless input apparatus comprising:
   a pointing device which detects three-dimensional components of an externally applied pressure;
   a signal process unit which defines a moving direction of a pointer based on an x-axis component and a y-axis component of the pressure, and detects whether the pointing device is pressed or not based on a z-axis component of the pressure;
   a pointer control unit which moves a position of the pointer based on the defined moving direction;

a process execution unit which generates a predefined command data when the pointing device is pressed; and a wireless communication unit which transmits the command data to an external device using a wireless communication means;

wherein said pointing device includes:
- an operational part to which a three-dimensional external pressure is applied; and
- a sheet-like pressure-sensitive resistance member which detects the three-dimensional applied pressure, wherein said sheet-like pressure-sensitive resistance member includes first electrode to detect the z-axis component of the pressure, a fan shaped second electrode to detect the x-axis component of the pressure, and a fan shaped third electrode to detect the y-axis component of the pressure.

4. A wireless input apparatus comprising:

a pointing device which detects three-dimensional components of an externally applied pressure;

a signal process unit which defines a moving direction of a pointer based on an x-axis component and a y-axis component of the pressure, and detects whether the pointing device is pressed or not based on a z-axis component of the pressure;

a pointer control unit which moves a position of the pointer based on the defined moving direction;

a process execution unit which generates a predefined command data when the pointing device is pressed; and a wireless communication unit which transmits the command data to an external device using a wireless communication means;

wherein said pointing device includes:
- an operational part to which a three-dimensional external pressure is applied; and
- a sheet-like pressure-sensitive resistance member which detects the three-dimensional applied pressure, wherein said sheet-like pressure-sensitive resistance member has an electrode to detect the z-axis component of the pressure and which is arranged at a central part of its surface, and a fan-shaped pattern of a plurality of electrodes each of which detects either the x-axis or the y-axis component of the pressure surrounding the central part.

5. A wireless input apparatus comprising:

a pointing device which detects three-dimensional components of an externally applied pressure;

a pointer control unit which controls a pointer based on the detected three-dimensional components of the pressure;

a display unit which displays the pointer on a operational screen for a user; and a wireless communication unit which transmits a command specified by the pointer to an external device using a wireless communication means;

wherein said pointing device includes:
- an operational part to which a three-dimensional external pressure is applied; and
- a sheet-like pressure-sensitive resistance member which detects the three-dimensional applied pressure, wherein said sheet-like pressure-sensitive resistance member includes a first electrode to detect the z-axis component of the pressure, a fan shaped second electrode to detect the x-axis component of the pressure, and a fan shaped third electrode to detect the y-axis component of the pressure.

6. A wireless input apparatus comprising:

a pointing device which detects three-dimensional components of an externally applied pressure;

a pointer control unit which controls a pointer based on the detected three-dimensional components of the pressure;

a display unit which displays the pointer on a operational screen for a user; and a wireless communication unit which transmits a command specified by the pointer to an external device using a wireless communication means;

wherein said pointing device includes:
- an operational part to which a three-dimensional external pressure is applied; and
- a sheet-like pressure-sensitive resistance member which detects the three-dimensional applied pressure, wherein said sheet-like pressure-sensitive resistance member has an electrode to detect the z-axis component of the pressure and which is arranged at a central part of its surface, and a fan-shaped pattern of a plurality of electrodes each of which detects either the x-axis or the y-axis component of the pressure surrounding the central part.

* * * * *